(No Model.) 5 Sheets—Sheet 1.

L. GUTMANN.
DYNAMO OR MOTOR.

No. 419,661. Patented Jan. 21, 1890.

Witnesses:
D. W. Gardner
G. T. Miatt

Inventor:
Ludwig Gutmann
By his Attorney,
Edward P. Thompson.

(No Model.)  
L. GUTMANN.  
DYNAMO OR MOTOR.

No. 419,661.  
5 Sheets—Sheet 2.  
Patented Jan. 21, 1890.

Witnesses:
D. W. Gardner.
G. T. Miatt

Inventor:
Ludwig Gutmann,
By his Attorney
Edward P. Thompson.

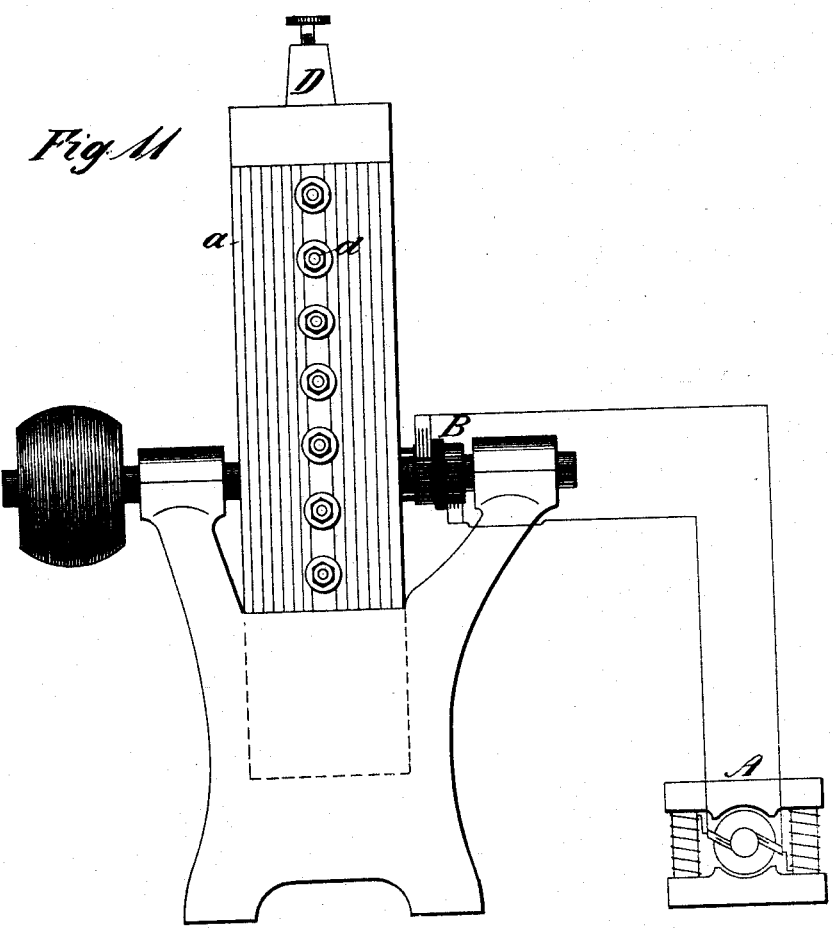

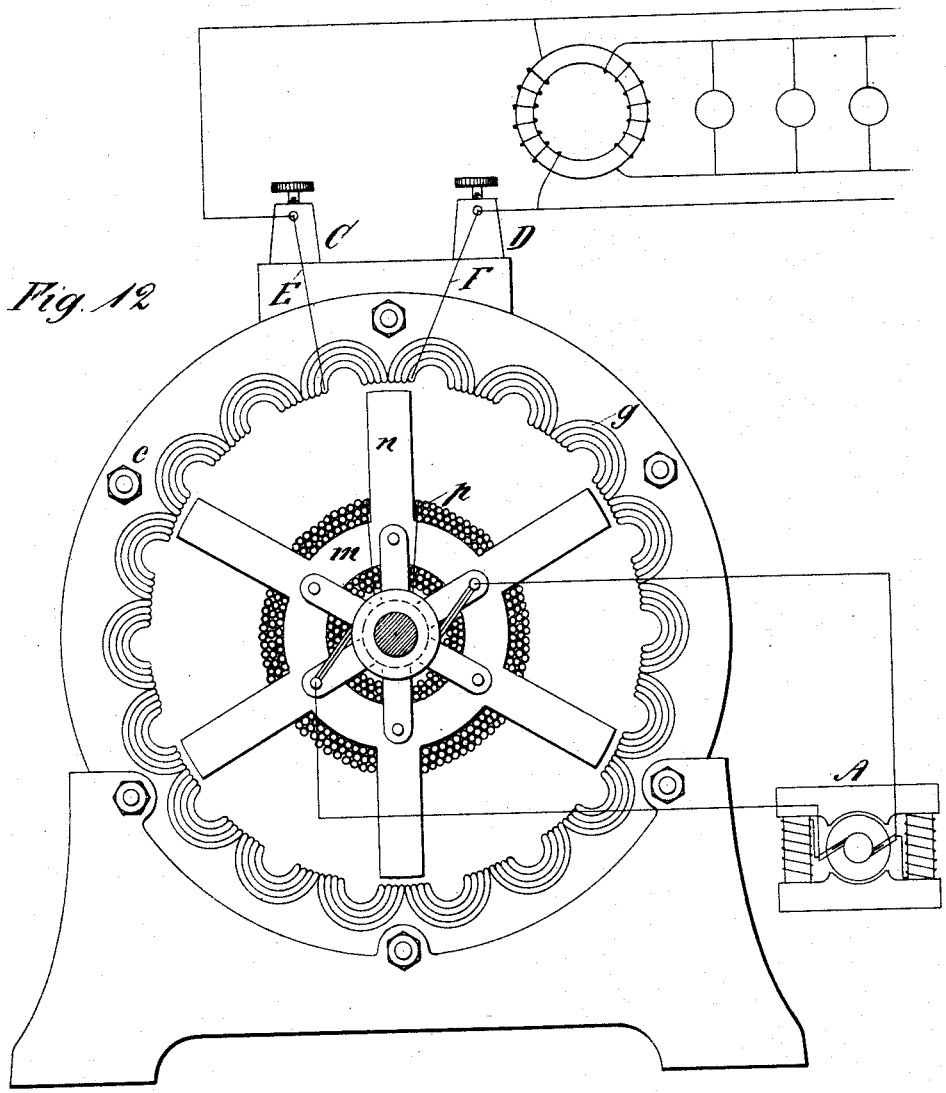

(No Model.)  
5 Sheets—Sheet 5.

L. GUTMANN.
DYNAMO OR MOTOR.

No. 419,661.  Patented Jan. 21, 1890.

ATTEST,
Ferdinand Strick
George H. Murray

INVENTOR,
Ludwig Gutmann
by his Attorney
Edward P. Thompson.

UNITED STATES PATENT OFFICE.

LUDWIG GUTMANN, OF FORT WAYNE, INDIANA.

DYNAMO OR MOTOR.

SPECIFICATION forming part of Letters Patent No. 419,661, dated January 21, 1890.

Application filed September 18, 1888. Serial No. 285,759. (No model.)

*To all whom it may concern:*

Be it known that I, LUDWIG GUTMANN, an alien and a subject of the Emperor of Germany, and a resident of Fort Wayne, in the county of Allen and State of Indiana, have invented certain new and useful Improvements in Dynamo-Electric Machines or Motors, of which the following is a specification.

My present invention relates to a dynamo or electric motor having a stationary armature and a rotary field-magnet. When employed as a dynamo it is adapted to generate alternating currents.

The mechanical construction of the device is exhibited in the accompanying drawings, in which—

Figure 1:
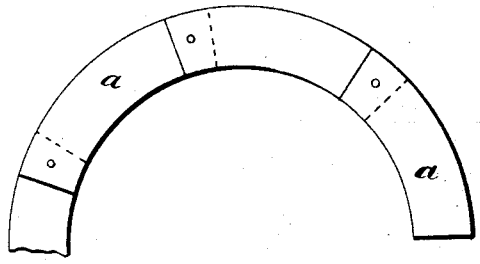
Figure 2:
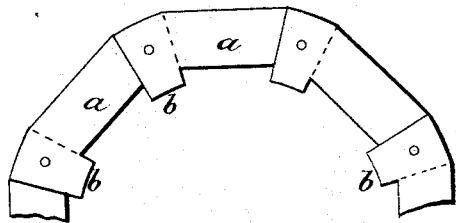
Figure 3:
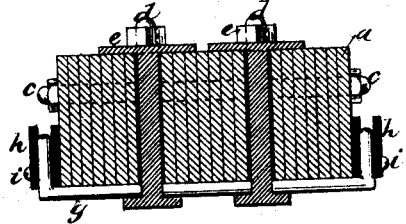
Figure 3A:
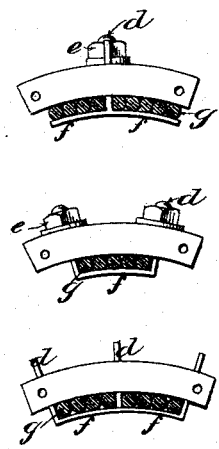
Figure 4:
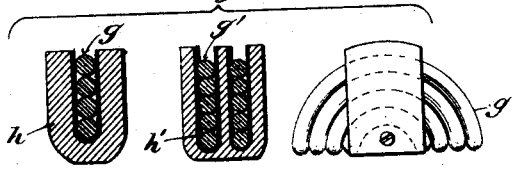
Figure 6:
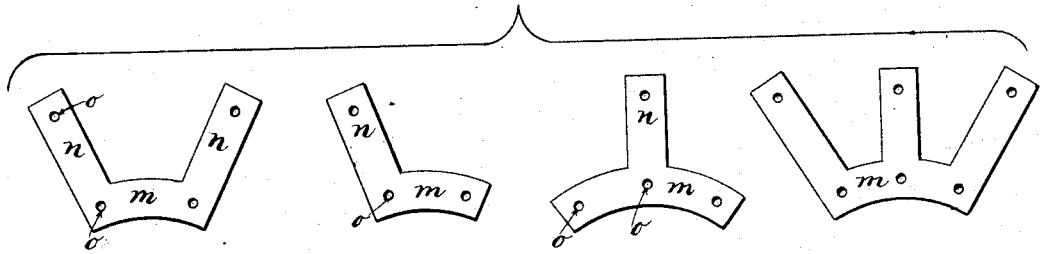
Figure 5:
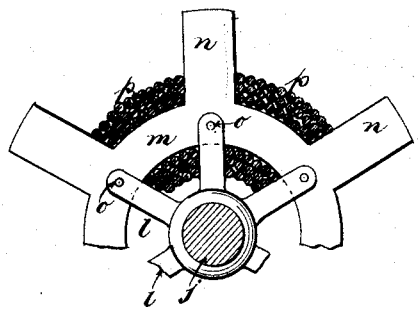
Figure 9:
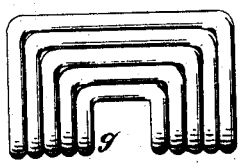
Figure 7:
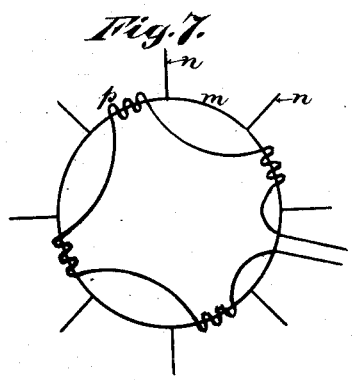
Figure 10:
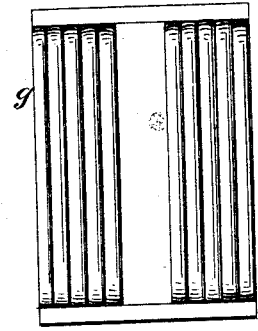
Figure 8:
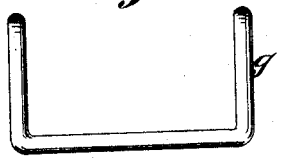
Figure 13:
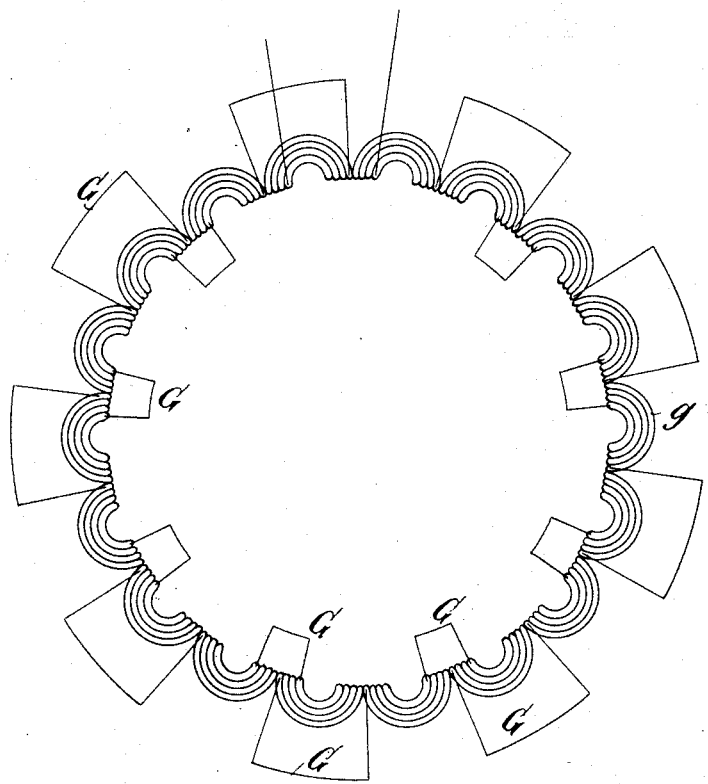
Figure 14:
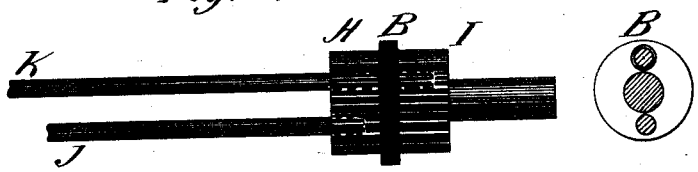

Figure 1 is a view in elevation of a portion of the iron core of the armature. Fig. 2 is a similar view of a modification of Fig. 1. Fig. 3 is a sectional view of the armature shown in Figs. 1 and 2, showing also a view of the coil and of the bolts which sustain the coil and of the bolt which secures together the iron plates of which the core is composed. Fig. 3$^a$ represents three varieties of bolt for holding the coil to the core, the said bolts being shown in a rectangular direction to that in which are shown the bolts in Fig. 3. Fig. 4 at the left shows an insulating-piece for supporting a portion of the coil, and at the right is shown a side view of the same, while at the middle is shown a modification of the same. Fig. 5 shows a portion of the rotary field-magnet and some of the coil thereon. Fig. 6 shows different forms of supports for the coil and adapted to be attached to the radial spokes of the field-magnet shaft. Fig. 7 is a diagram of a manner of winding the field-magnet. Figs. 8, 9, and 10 are rectangular views of the coil employed in the armature, as more fully described herein. Fig. 11 is a view in elevation of the complete machine as to one side, while Fig. 12 is a similar view of an adjacent side, showing the exciter and translating devices in circuit, the former being connected in such a manner as to excite the rotary coils. The same exciter is shown in Fig. 11. Fig. 13 is a view of the stationary coils removed from the core, so that the electric connections are better exhibited. Fig. 14 shows the collector on an enlarged scale, showing how the terminals of the coils are secured to the collector.

The core of the armature is built up of iron pieces $a$, straight, as in Fig. 2, or curved, as in Fig. 1, and with projections $b$, pointing toward the center of the armature, as shown in Fig. 2, or without such projections, as shown in Fig. 1. The pieces $a$ are held together by means of bolts, screws, or similar fastening devices. One of these bolts is shown at $c$ in Fig. 3. Space is left between some of the pieces or segments $a$ for the passage of bolts $d$, having nuts $e$ on their upper ends and supporting-arms $f$ on their lower ends, the said arms being shown in full view in Fig. 3$^a$. These arms press against the coil on its under side, and thus serve to hold the same to the core.

The coil is represented by the letter $g$. On the sides of the core are seen the insulating-supports $h$, also seen in Fig. 3, and consisting of a grooved piece of insulating substance attached by bolts or screws $i$ to the core. The conductor forming this coil passes through the groove of the support $h$ on one side of the core, and then under the lower side of the core, and then through the groove of the support $h$ on the other side of the core, and then back again several times over the same course, until there is a coil of the form shown in Figs. 8, 9, and 10. In Fig. 8 the form is that of a rectangle having one side omitted. In Fig. 9 it is that of a rectangular area having a rectangular piece cut out of one side. In Fig. 10 it is that of a rectangular area having a rectangular piece cut out of the central portion. It will be noticed that the core is of such a form that most of the conductor is on the under side of the core—*i. e.*, on that side which is nearest the field-magnet, which is shown in Fig. 5, and is adapted to be located within the ring-armature, which is shown in part in Fig. 1.

In practice the coil is made of greater length in proportion to its height than shown in Figs. 8, 9, and 10, so that the greater portion of the conductor can be exposed to the field-magnets. The proportion is shown about right in Fig. 3. At the middle of Fig.

4 is shown a double insulating-support, so that the amount of wire in said coil may be increased.

The coil of the armature may be described conveniently as a flat coil of conductor having two opposite portions parallel to each other and at right angles to the plane of the coil.

The rotary field-magnet consists of the combination of a shaft $j$, having radial spokes $l$, and arc-shaped pieces of iron $m$, having outwardly-pointing projections $n$, the arc-shaped pieces being adapted to be secured to the spokes by bolts passing through the holes $o$. The coil $p$ is wound successively upon the arc-shaped pieces $m$, as shown in outline in Fig. 7. Two projections $n$ and one arc-shaped piece $m$, taken together, form a horseshoe-magnet after the coil $p$ is wound thereon.

The electrical features in the application of the dynamo consist of the combination of an exciting-dynamo A, conductors therefrom to the collector of the dynamo proper, binding-posts C and D on top of the stationary coils $g$, and connected with the terminal wires E and F, respectively, of the said field-magnet, conductors G, connecting the coils $p$ in series with one another, and terminals J and K for the rotating coils $g$, inserted, respectively, into the rings H and I of the collector B.

To adapt this form of dynamo for a motor, the chief differences in the relation of the cores of the stationary armature and the revolving field-magnets are, that while in the dynamo the magnets are bulky and of larger weight and section than the armature, this is reversed in the case of the motor, the stationary armature being constructed to have a larger sectional area than in the dynamo, and the core weight of the motor armature being preferably greater than the weight of the revolving field-magnets.

I claim as my invention—

1. In a dynamo, the combination of a stationary armature constructed in sections, each section consisting of pieces of iron provided with holes for the reception of retaining-bolts, a second set of bolts passing between the said pieces of iron and provided with projections which press against a flat coil of the armature, the said coil passing back and forth across the inner surface of the armature and retained permanently against the said surface, and a suitable field-magnet, rotary and located so that its magnetic poles are adapted to just escape the said coil.

2. In a dynamo-electric machine or motor, an armature-core constructed of superposed layers of iron divided in vertical plane in two or more separate rings by air-spaces, bolts passed between said separate rings in said air-spaces, a coil lying against the inner surface of said core, and projections to said bolts pressing against said coil.

3. In a dynamo-electric machine or motor, an armature-core constructed of insulated laminæ of sheet-iron provided with holes for the reception of retaining-bolts, said iron core being divided into two or more parallel rings by separating air-spaces, bolts located between the rings in said air-spaces, the armature-coil lying against the inner surface of said core, and projections to said bolts pressing against said coil.

4. In a dynamo-electric machine or motor, an attachment-piece for supporting the armature-coils, consisting of the arc-shaped strip $f$, pressing against the winding $g$, and a centrally-placed arm $d$, provided with a thread and a nut $e$, for firmly securing the winding $g$ to the core.

5. In a dynamo-electric machine or motor, an attachment-piece for supporting the armature-winding, consisting of the arc-shaped strip or bar $f$, pressing against the winding $g$, and one, two, or more rods or arms $d$, rigidly secured to the said strip or bar $f$, radially diverging from it, and the said arms $d$ being provided with a thread and a nut for securely fastening the winding to the core.

6. In a dynamo, the combination of a stationary armature consisting of two or more parallel ring-cores, each ring-core constructed in sections and each section provided with holes for the reception of bolts, a second set of bolts passing between the said parallel ring-cores and provided with projections which press against a flat winding of the armature, the said winding being subdivided into coils and wound and retained permanently against the inner periphery of the iron ring-core overlapping and attached at the sides, and a suitable field-magnet, rotary and located centrally to the armature.

7. In a dynamo-electric machine, the combination of a stationary ring-armature, insulating grooved pieces on each side of the core of said armature, and a conductor wound through said grooves and back and forth upon the inner surface of said armature, and retaining-bolts passing through said armature and provided with projections which press against the said conductor.

8. In a dynamo, the combination of a stationary armature constructed in sections, each section consisting of pieces of iron provided with holes for the reception of bolts, the latter passing between the said pieces of iron and provided with projections which press against a flat winding of the armature, the said winding being subdivided into coils and wound and retained permanently against the inner periphery of the iron ring-core, overlapping and attached at the sides, and a suitable field-magnet, rotary and located so that its magnet-poles are adapted to just escape the said coil.

9. In a dynamo, the combination of a stationary armature constructed in sections, each section consisting of pieces of iron provided with holes for the reception of bolts, a second set of bolts passing between the said sections and provided with projections which press against a flat winding of the armature, the said winding being subdivided into coils and wound and retained permanently against the inner periphery of the iron ring-core, overlapping and attached at the sides, and a suitable field-magnet, rotary and located so that its magnet-poles are adapted to just escape the said winding.

In testimony that I claim the foregoing as my invention I have signed my name, in presence of two witnesses, this 23d day of July, 1888.

LUDWIG GUTMANN.

Witnesses:
WILLIAM C. RYAN,
HENRY MCLAIN.